United States Patent
Balbontin et al.

(10) Patent No.: US 7,005,487 B2
(45) Date of Patent: Feb. 28, 2006

(54) CATALYST SYSTEM FOR THE POLYMERIZATION OF OLEFINS

(75) Inventors: Giulio Balbontin, Savona (IT); Giampiero Morini, Padova (IT)

(73) Assignee: Basell Poliolefine Italia S.R.L., Milan (IT)

( * ) Notice: Subject to any disclaimer, the term of this patent is extended or adjusted under 35 U.S.C. 154(b) by 0 days.

(21) Appl. No.: 10/486,876

(22) PCT Filed: Jun. 23, 2003

(86) PCT No.: PCT/EP03/06635

§ 371 (c)(1),
(2), (4) Date: Feb. 13, 2004

(87) PCT Pub. No.: WO2004/005359

PCT Pub. Date: Jan. 15, 2004

(65) Prior Publication Data

US 2005/0014631 A1    Jan. 20, 2005

Related U.S. Application Data

(60) Provisional application No. 60/418,884, filed on Oct. 15, 2002.

(30) Foreign Application Priority Data

Jul. 2, 2002    (EP) .................................. 02077653

(51) Int. Cl.
*C08F 4/42*    (2006.01)
*C08F 210/00*    (2006.01)

(52) U.S. Cl. ................ 526/142; 526/123.1; 526/124.1; 526/124.3; 526/124.2; 526/348; 502/103; 502/127; 502/119; 502/134

(58) Field of Classification Search ............. 526/123.1, 526/124.1, 124.3, 124.2, 348, 142; 502/103, 502/127, 119, 134
See application file for complete search history.

(56) References Cited

U.S. PATENT DOCUMENTS

| 4,298,718 A | | 11/1981 | Mayr et al. ................. 526/125 |
| 4,495,338 A | | 1/1985 | Mayr et al. ................. 526/125 |
| 4,522,930 A | * | 6/1985 | Albizzati et al. ........... 502/124 |
| 4,822,840 A | | 4/1989 | Kioka et al. ................ 525/240 |
| 5,122,432 A | | 6/1992 | Hammann, IV et al. .... 430/138 |
| 5,139,985 A | * | 8/1992 | Barbe' et al. ............... 502/109 |
| 5,244,855 A | | 9/1993 | Morini et al. ............... 502/126 |
| 5,942,586 A | | 8/1999 | Herrmann et al. .......... 526/160 |

FOREIGN PATENT DOCUMENTS

| EP | 0086473 | | 8/1983 |
| EP | 0125911 | | 11/1984 |
| EP | 0263718 | | 4/1988 |
| EP | 0598543 | | 5/1994 |
| EP | 0633272 | | 1/1995 |
| WO | 0063261 | | 10/2000 |
| WO | WO 00/63261 | * | 10/2000 |

\* cited by examiner

Primary Examiner—Ling-Sui Choi

(57) ABSTRACT

A solid catalyst component for the polymerization of olefins, comprising: an inert porous support, Mg, Ti, halogen and an electron donor selected from succinates of formula (I) wherein the radicals $R^1$ and $R^2$ equal to or different form each other, are hydrocarbon groups, the radicals $R^3$, $R^4$, $R^5$ and $R^6$, equal to or different from each other, are hydrogen or hydrocarbon groups.

(I)

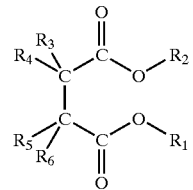

20 Claims, No Drawings

CATALYST SYSTEM FOR THE POLYMERIZATION OF OLEFINS

This application is the U.S. national phase of International Application PCT/EP2003/006635, filed Jun. 23, 2003, claiming priority to European Patent Application 02077653.0 filed Jul. 2, 2002, and the benefit under 35 U.S.C. 119(e) of U.S. Provisional Application No. 60/418,884 filed Oct. 15, 2002.

The present invention relates to a catalyst component supported on an inert porous support for the polymerization of olefins, and to the use of said catalysts in the polymerization of olefins $CH_2$=CHR in which R is hydrogen or a hydrocarbyl radical with 1–12 carbon atoms. In particular the present invention relates to a catalyst component, suitable for the stereospecific polymerization of olefins, comprising Ti, Mg, halogen and an electron donor compound selected from esters of succinic acids (succinates). Said catalyst component is supported on an inert porous support such as porous polymer or porous inorganic oxides. This catalyst when used in the polymerization of olefins, and in particular of propylene, are capable to give polymers in high yields with high isotactic index expressed in terms of high xylene insolubility and broad molecular weight distribution (polydispersity). The chemical class of succinates is known in the art. EP-A-86473 mentions the use of unsubstituted succinates as internal donors in catalyst components for the polymerization of olefins. The use of diisobutyl succinate and di-n-butyl succinate is also exemplified. The results obtained in terms of isotactic index and yields are however poor. The use of polycarboxylic acid esters, including succinates, as internal donors in catalyst components for the polymerization of olefins, is also generically disclosed in EP 125911. Diethyl methylsuccinate and diallyl ethylsuccinate are mentioned in the description although they are not exemplified. Furthermore, EP263718 mentions, but does not exemplify the use of diethyl methylsuccinate and di-n-butyl ethylsuccinate as internal donors. Substituted succinates are cited in WO 00/63261 but in this documents it is not cited the possibility to support the catalyst system described herein. Supported catalyst system containing Ti, Mg, halogen and a diether as internal donor are known from U.S. Pat. No. 5,122,432. It relates to a catalyst system containing Ti and Mg, and a diether as internal donor supported on a metal oxides. According to this document the supported catalyst system is more active and more stereospecific than the unsupported one. This document does not relates to a catalyst system containing a succinate as internal donor. U.S. Pat. No. 5,244,855 relates to a catalyst system containing Ti, Mg, and an electron donor compounds supported on a porous organic resin. The described catalyst system has an enhanced stereoselectivity and produces polymer with a better morphology than the unsupported one. Even if succinates are cited as electron donor compounds, they have never been tested. The applicant found that when a catalyst system comprising magnesium, a titanium compound and a succinate as electron donor is supported on an inert porous support it is possible to obtain polymers having a broader molecular weight distribution (polydispersity) than the unsupported catalyst. An object of the present invention is a solid catalyst component for the polymerization of olefins $CH_2$=CHR, in which R is hydrogen or a hydrocarbyl radical with 1–12 carbon atoms, comprising an inert porous support, Mg, Ti, halogen and an electron donor selected from succinates of formula (I):

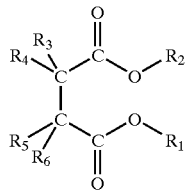

(I)

wherein the radicals $R^1$ and $R^2$, equal to or different from each other, are a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; the radicals $R^3$, $R^4$, $R^5$ and $R^6$, equal to or different from each other, are hydrogen or a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; and the radicals $R^3$, $R^4$, $R^5$ and $R^6$ which are joined to the same carbon atom can be linked together to form a $C_3$–$C_8$ ring. $R^1$ and $R^2$ are preferably a linear or branched, saturated or unsaturated $C_1$–$C_8$ alkyl, $C_3$–$C_8$ cycloalkyl, $C_6$–$C_8$ aryl, $C_7$–$C_8$ alkylaryl or $C_7$–$C_8$ arylalkyl radicals. Particularly preferred are the compounds in which $R_+$ and $R^2$ are selected from primary $C_1$–$C_8$ alkyl radicals and in particular branched primary $C_1$–$C_8$ alkyl radicals. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl. One of the preferred groups of compounds described by the formula (I) is that in which $R^3$ to $R^5$ are hydrogen and $R^6$ is a branched $C_3$–$C_{10}$ alkyl, $C_3$–$C_{10}$ cycloalkyl, $C_6$–$C_{10}$ aryl, $C_7$–$C_{10}$ alkylaryl or $C_7$–$C_{10}$ arylalkyl. Particularly preferred are the compounds in which $R^6$ is a branched primary $C_3$–$C_{10}$ alkyl group or a $C_3$–$C_{10}$ cycloalkyl group. Specific examples of suitable monosubstituted succinate compounds are diethyl sec-butylsuccinate, diethyl thexylsuccinate, diethyl cyclopropylsuccinate, diethyl norbornylsuccinate, diethyl(10-)perhydronaphthylsuccinate, diethyl trimethylsilylsuccinate, diethyl methoxysuccinate, diethyl p-methoxyphenylsuccinate, diethyl p-chlorophenylsuccinate diethyl phenylsuccinate, diethyl cyclohexylsuccinate, diethyl benzylsuccinate, diethyl (cyclohexylmethyl)succinate, diethyl t-butylsuccinate, diethyl isobutylsuccinate, diethyl isopropylsuccinate, diethyl neopentylsuccinate, diethyl isopentylsuccinate, diethyl(1,1,1-trifluoro-2-propyl)succinate, diethyl(9-fluorenyl)succinate, diisobutyl phenylsuccinate, diisobutyl sec-butylsuccinate, diisobutyl thexylsuccinate, diisobutyl cyclopropylsuccinate, diisobutyl(2-norbornyl)succinate, diisobutyl(10-)perhydronaphthylsuccinate, diisobutyl trimethylsilylsuccinate, diisobutyl methoxysuccinate, diisobutyl p-methoxyphenylsuccinate, diisobutyl p-chlorophenylsuccinate, diisobutyl cyclohexylsuccinate, diisobutyl benzylsuccinate, diisobutyl (cyclohexylmethyl)succinate, diisobutyl t-butylsuccinate, diisobutyl isobutylsuccinate, diisobutyl isopropylsuccinate, diisobutyl neopentylsuccinate, diisobutyl isopentylsuccinate, diisobutyl(1,1,1-trifluoro-2-propyl)succinate, diisobutyl(9-fluorenyl)succinate, dineopentyl sec-butylsuccinate, dineopentyl thexylsuccinate, dineopentyl cyclopropylsuccinate, dineopentyl(2-norbornyl)succinate, dineopentyl(10-)perhydronaphthylsuccinate, dineopentyl trimethylsilylsuccinate, dineopentyl methoxysuccinate, dineopentyl p-methoxyphenylsuccinate, dineopentyl p-chlorophenylsuccinate, dineopentyl phenylsuccinate, dineopentyl cyclohexylsuccinate, dineopentyl benzylsuccinate, dineopentyl (cyclohexylmethyl)succinate, dineopentyl t-butylsuccinate, dineopentyl isobutylsuccinate, dineopentyl isopropylsuccinate, dineopentyl neopentylsuccinate, dineopentyl isopentylsuccinate, dineopentyl(1,1,1-trifluoro-2-propyl)succinate, dineopentyl(9-fluorenyl)succinate.

Another preferred group of compounds within those of formula (I) is that in which at least two radicals from $R^3$ to $R^6$ are different from hydrogen and are selected from $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical optionally containing heteroatoms. Particularly preferred are the compounds in which the two radicals different from hydrogen are linked to the same carbon atom. Specific examples of suitable 2,2-disubstituted succinates are: diethyl 2,2-dimethylsuccinate, diethyl 2-ethyl-2-methylsuccinate, diethyl 2-benzyl-2-isopropylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropyl diethyl 2-isobutyl-2-ethylsuccinate, diethyl 2-(1,1,1-trifluoro-2-propyl)-2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-(cyclohexylmethyl)- 2-isobutylsuccinate, diisobutyl 2-cyclopentyl-2-n-propylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-isobutyl-2-ethylsuccinate, diisobutyl 2-(1,1,1-trifluoro-2-propyl)-2-methylsuccinate, diisobutyl 2-isopentyl-2-isobutylsuccinate, diisobutyl 2,2-diisopropylsuccinate, diisobutyl 2-phenyl-2-n-propylsuccinate, dineopentyl 2,2-dimethylsuccinate, dineopentyl 2-ethyl-2-methylsuccinate, dineopentyl 2-benzyl-2-isopropylsuccinate, dineopentyl 2-(cyclohexylmethyl)-2-isobutylsuccinate, dineopentyl 2-cyclopentyl-2-n-propylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-isobutyl-2-ethylsuccinate, dineopentyl 2-(1,1,1-trifluoro-2-propyl)-2-methylsuccinate, dineopentyl 2,2-diisopropylsuccinate, dineopentyl 2-isopentyl-2-isobutylsuccinate, dineopentyl 2-phenyl-2-n-butylsuccinate.

Furthermore, also the compounds in which at least two radicals different from hydrogen are linked to different carbon atoms, that is $R^3$ and $R^5$ or $R^4$ and $R^6$ are particularly preferred. Specific examples of suitable compounds are: diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl)succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1,1,1-trifluoro-2-propyl)succinate, diisobutyl 2,3-n-propylsuccinate, diisobutyl 2,3-(9-fluorenyl)succinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3 bis(2-ethylbutyl) succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2-propyl)succinate, dineopentyl 2,3-n-propylsuccinate, dineopentyl 2,3(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, dineopentyl 2,3-diethyl-2,3-diisopropylsuccinate. As mentioned above the compounds according to formula (I) in which two or four of the radicals $R^3$ to $R^6$ which are joined to the same carbon atom are linked together to form a $C_3$–$C_8$ ring are also preferred. Specific examples of suitable compounds are 1-(ethoxycarbonyl)-1-(ethoxyacetyl)-2,6-dimethylcyclohexane, 1-(ethoxycarbonyl)-1-(ethoxyacetyl)-2,5-dimethylcyclopentane, 1-(ethoxycarbonyl)-1-(ethoxyacetylmethyl)-2-methylcyclohexane, 1-(ethoxycarbonyl)-1-(ethoxy(cyclohexyl)acetyl)cyclohexane. It is easily derivable for the ones skilled in the art that all the above mentioned compounds can be used either in form of pure stereoisomers or in the form of mixtures of enantiomers, or mixture of diastereoisomers and enantiomers. When a pure isomer is to be used it is normally isolated using the common techniques known in the art. In particular some of the succinates of the present invention can be used as a pure rac or meso forms, or as mixtures thereof, respectively.

As explained above, the catalyst components of the invention comprise, in addition to the above electron donors, an inert porous support, Ti, Mg and halogen. In particular, the catalyst components comprise a titanium compound, having at least a Ti-halogen bond and the above mentioned electron donor compound, and a Mg halide which are supported on said inert porous support. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support in components of catalysts for the polymerization of olefins are characterized by X-ray spectra in which the most intense diffraction line that appears in the spectrum of the non-active halide is diminished in intensity and is broadened to form a halo. The preferred titanium compounds used in the catalyst component of the present invention are $TiCl_4$ and $TiCl_3$; furthermore, also Ti-haloalcoholates of formula $Ti(OR^7)_{n-y}X_y$, where n is the valence of titanium, X is halogen and y is a number between 1 and n and $R^7$ is a $C_2$–$C_8$ alkyl, $C_3$–$C_8$ cycloalkyl or $C_6$–$C_8$ aryl radical, can be used. In the supported components the Mg/Ti molar ratio is from 0.5:1 to 10:1, in particular from 2:1 to 6:1, and the molar ratio Ti/succinate is from 0.5:1 to 5:1. The inert porous support is present in quantities greater than 40% by weight with respect to the total weight of the component. The inert porous support is for example, porous oxides such as porous metal oxides for example silica, alumina, Al—Si, porous polymer such as styrene/divinylbenzene copolymers described for example in U.S. Pat. No. 5,244,855 or EP 633 272, polyethylene or polypropylene. Preferred inert porous support are metal oxides more preferably silica or alumina. Preferred porous supports have a porosity greater than 0.3 cc/g, measured with the Hg method described below, preferably from 1 to 3 cc/g. The surface area is greater than 30 $m^2$/g (BET) and in particular greater than 100 $m^2$/g, more preferably 100 to 400 $m^2$/g. The metal oxides generally contain hydroxyl surface groups (e.g. in an amount of from 1 to 5 mmoles/g of oxide), but may also have none of them. Preferably the oxides are used in the anhydrous state, i.e., free from chemically uncombined water. Chemically uncombined water, however, can be present in a quantity smaller than 30 mmoles/g of support. Said water can be removed by subjecting the oxides to heating at temperatures from 150° C. to 250° C. The amount of hydroxyl groups is controlled by calcining the oxides at temperatures usually from 250° C. to 900° C. (the higher the temperature the smaller the number of hydroxyls present).

Porous polymer are generally free of hydroxy group, but they can also be introduced in the polymer chain as described for example in EP 633 272, EP 598 543, and U.S. Pat. No. 5,942,586.

Different methods can be used for the preparation of the catalyst component described in the present invention. The preferred method comprises the steps of:

(i) in impregnating the inert porous support by suspending it in a solution of magnesium chloride in an organic solvent, such as alcohol or ether, or in a hydrocarbon solution (hexane, heptane) of a $MgCl_2.nTi(OR^7)_4$ complex where n is a number from 1 to 3, and $R^7$ is an $C_2$–$C_8$ alkyl, $C_3$–$C_8$ cycloalkyl or $C_6$–$C_8$ aryl radical and then evaporating the solvent.

(ii) reacting the support thus obtained with an excess of $TiCl_4$ containing a succinate of formulal (I) in solution at temperatures from 60° C. to 135° C.;

(iii) separating the solid hot from the excess of $TiCl_4$ and then washed thoroughly with hexane or heptane until there are no chlorine ions in the wash.

(iv) optionally repating the treatments (ii) and (iii).

It is also possible to react the inert porous impregnated of a magnesium dichloride support first with the succinate of formula (I) and then with the titanium tetrachloride.

The succinate of formula (I) can also be added during the impregnation of the porous support, or can be reacted after the reaction with the titanium compound. In this case, it is best to conduct the reaction in the presence of an aromatic solvent, such as benzene and toluene. When the porous support is used with magnesium compound solutions other than magnesium halides, it is best to convert said compounds into halides by reacting them with halogenating agents, such as gaseous HCl, $SiCl_4$, Al-alkyl halides, and $Cl^3SiR^8$ wherein $R^8$ has the same meaning than $R^1$. The support thus impregnated and treated is then reacted with $TiCl_4$ and with the ether compound following the methods indicated above.

Suitable magnesium compounds which are other than the magnesium halides include $R^7MgX$, $MgR^7_2$, $Mg(OR^7)_2$, $XmgOR^7$, $MgX_2.nTi(OR^7)_4$ where X is Cl or Br $R^7$ is an $C_2$–$C_8$ alkyl, $C_3$–$C_8$ cycloalkyl or $C_6$–$C_8$ aryl radical and n is from 1 to 4. In particular, it is an object of the present invention a catalyst for the polymerization of olefins $CH_2$=CHR, in which R is hydrogen or a hydrocarbyl radical with 1–12 carbon atoms, comprising the product of the reaction between:

(a) a solid catalyst component comprising an inert porous support, Mg, Ti and halogen and an electron donor selected from succinates of formula (I);
(b) an alkylaluminum compound and, optionally,
(c) one or more electron donor compounds (external donor).

The alkylaluminum compound (b) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$. Also alkylalumoxanes can be used.

As mentioned above the catalyst system according to the present invention is able to produce a polymer having a polydispersity index higher then the corresponding unsupported catalyst.

For applications in which a very high isotactic index is required the use of an external donor compound is normally advisable. The external donor (c) can be of the same type or it can be different from the succinate of formula (I). Preferred external electron donor compounds include silicon compounds, ethers, esters, such as ethyl 4-ethoxybenzoate, amines, heterocyclic compounds and particularly 2,2,6,6-tetramethylpiperidine, ketones and the 1,3-diethers of the general formula (II):

wherein $R^I$, $R^{II}$, $R^{III}$, $R^{IV}$, $R^V$ and $R^{VI}$ are equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R'-R^{VIII}$ groups can be linked to form a cycle. Particularly preferred are the 1,3-diethers in which $R^{VII}$ and $R^{VIII}$ are selected from $C_1-C_4$ alkyl radicals, $R^{III}$ and $R^{IV}$ form a condensed unsaturated cycle and $R^I$, $R^{II}$, $R^V$ and $R^{VI}$ are hydrogen. The use of 9,9-bis(methoxymethyl)fluorene is particularly preferred. Another class of preferred external donor compounds is that of silicon compounds of formula $R_a{}^{10}R_b{}^{11}Si(OR^{12})_c$, where a and b are integer from 0 to 2, c is an integer from 1 to 3 and the sum (a+b+c) is 4; $R^{10}$, $R^{11}$, and $R^{12}$, are $C_1-C_{18}$ hydrocarbon groups optionally containing heteroatoms. Particularly preferred are the silicon compounds in which a is 1, b is 1, c is 2, at least one of $R^{10}$ and $R^{11}$ is selected from branched alkyl, alkenyl, alkylene, cycloalkyl or aryl groups with 3–10 carbon atoms optionally containing heteroatoms and $R^{12}$ is a $C_1-C_{10}$ alkyl group, in particular methyl. Examples of such preferred silicon compounds are cyclohexylmethyldimethoxysilane, diphenyldimethoxysilane, methyl-t-butyldimethoxysilane, dicyclopentyldimethoxysilane, 2-ethylpiperidinyl-2-t-butyldimethoxysilane and (1,1,1-trifluoro-2-propyl)-2-ethylpiperidinyldimethoxysilane and (1,1,1-trifluoro-2-propyl)-methyldimethoxysilane. Moreover, are also preferred the silicon compounds in which a is 0, c is 3, $R^{11}$ is a branched alkyl or cycloalkyl group, optionally containing heteroatoms, and $R^{12}$ is methyl. Examples of such preferred silicon compounds are cyclohexyltrimethoxysilane, t-butyltrimethoxysilane and thexyltrimethoxysilane.

The electron donor compound (c) is used in such an amount to give a molar ratio between the organoaluminum compound and said electron donor compound (c) of from 0.1 to 500, preferably from 1 to 300 and more preferably from 3 to 100. As previously indicated, when used in the (co)polymerization of olefins, and in particular of propylene, the catalysts of the invention allow to obtain a broad molecular weigh distribution as indicated by the P.I. values, thus showing an excellent balance of properties and the processability of the polymers is greatly improved. As mentioned above the catalysts of the present invention can be used in the processes for the polymerization of olefins $CH_2=CHR$, in which R is hydrogen or a hydrocarbyl radical with 1–12 carbon atoms. Thus a further object of the present invention is a process for polymerizing one or more olefins $CH_2=CHR$, in which R is hydrogen or a hydrocarbyl radical with 1–12 carbon atoms, comprising, to contact under polymerization condition one or more olefins $CH_2=CHR$ in the presence of the catalyst system described above. The preferred α-olefins to be (co)polymerized are ethene, propene, 1-butene, 4-methyl-1-pentene, 1-hexene and 1-octene. In particular, the above-described catalyst system can be used in the (co)polymerization of propene and ethylene to prepare different kinds of products. For example the following products can be prepared: high density ethylene polymers (HDPE, having a density higher than 0.940 g/cm³), comprising ethylene homopolymers and copolymers of ethylene with α-olefins having 3–12 carbon atoms; linear low density polyethylenes (LLDPE, having a density lower than 0.940 g/cm³) and very low density and ultra low density (VLDPE and ULDPE, having a density lower than 0.920 g/cm³, to 0.880 g/cm³) consisting of copolymers of ethylene with one or more α-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other α-olefins having a content of units derived from propylene higher than 85% by weight (random copolymers); shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight. Particularly interesting are the propylene polymers obtainable with the catalyst of the invention showing broad MWD coupled with high isotactic index and high modulus. In fact, said polymers having a polydispersity index of higher than 4.8, a content of isotactic units expressed in terms of pentads of higher than 90% and a flexural modulus of at least 1000 MPa. Preferably, the flexural modulus is higher than 1100 and the percent of propylene units in form of pentads is higher than 95%. Any kind of polymerization process can be used with the catalysts of the invention that are very versatile. The polymerization can be carried out for example in slurry using as diluent an inert hydrocarbon solvent, or in bulk using the liquid monomer (for example propylene) as a reaction medium. Moreover, it is possible to carry out the polymerization process in gas-phase operating in one or more fluidized or mechanically agitated bed reactors. The catalyst system of the present invention can be used as such in the polymerization process by introducing it directly into the reactor. In the alternative, the catalyst system can be pre-polymerized before being introduced into the first polymerization reactor. The term pre-polymerized, as used in the art, means a catalyst which has been subject to a polymerization step at a low conversion degree. According to the present invention a catalyst is considered to be pre-polymerized when the amount the polymer produced is from about 0.1 up to about 1000 g per gram of solid catalyst component. The pre-polymerization can be carried out with the α-olefins selected from the same group of olefins disclosed before. In particular, it is especially preferred pre-polymerizing ethylene or mixtures thereof with one or more α-olefins in an amount up to 20% by mole. Preferably, the conversion of the pre-polymerized catalyst component is from about 0.2 g up to about 500 g per gram of solid catalyst component.

The pre-polymerization step can be carried out at temperatures from 0 to 80° C. preferably from 5 to 50° C. in liquid or gas-phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

EXAMPLES

Characterization

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

Determination of Polydispersity Index (P.I.)

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/sec. From the modulus separation value, one can derive the P.I. by way of the equation:

$$P.I.=54.6*(\text{modulus separation})^{-1.76}$$

in which the modulus separation is defined as:

modulus separation=frequency at $G'=500$ Pa/frequency at $G''=500$ Pa wherein G' is storage modulus and G" is the loss modulus.

Preparation of the Supports 15 g of silica (Grace 952) having surface area of 300 m2/g and porosity 1.55 cm3/g calcinated at 150° C. for 8 hrs were treated with 90 mL of $(CH_3)_3SiCl$ in reflux for 16 hrs. The solid was filtered and washed with anhydrous n-heptane at 60° C. until all traces of $(CH_3)_3SiCl$ were eliminated, then, the silica was dried under vacuum.

30 g of alumina having surface area of 340 m2/g and porosity 1.78 cm3/g (Ketjen.grade B), calcinated at 150° C. for 6 hrs was used without further treatments.

Example 1

Catalyst 1

5.3 g of silica treated as above were suspended in inert atmosphere in 28 mL of anhydrous n-heptane. Then, 24.4 mmoles of $MgCl_2$ $2.2Ti(OBu)_4$, prepared by dissolving a suitable quantity of $MgCl_2$ in $Ti(OBu)_4$ at 140° C. for 4 hrs, were added. The mixture was reacted for 4 hrs at 90° C. in a rotavapor flask and then the solvent was evaporated under vacuum.

At a temperature of 0° C. in inert atmosphere, 20 g of so obtained Mg modified silica were slowly added under agitation to 260 mL of $TiCl_4$ containing 3.3 mmoles of diethyl 2,3-bis(isopropyl)succinate. The mixture was heated to 120° C., allowed to react at this temperature for 60 min. Then the stirring was discontinued, the solid product was allowed to settle and the supernatant liquid was siphoned off. 260 mL of fresh $TiCl_4$ were added. The mixture was reacted at 120° C. for 30 min. Then the stirring was discontinued, the solid product was allowed to settle and the supernatant liquid was siphoned off. Again, 260 mL of fresh $TiCl_4$ were added. The mixture was reacted at 120° C. for 30 min. Then the stirring was discontinued, the solid product was allowed to settle and the supernatant liquid was siphoned off. The solid was washed six times with anhydrous hexane (6×100 mL) at 60° C. Finally, the solid was dried under vacuum. Characterization of the solid is reported in table 1.

Example 2

Catalyst 2

5 g silica treated as above are suspended in inert atmosphere in 28 mL of anhydrous n-heptane. Then, 3.5 mmoles of $MgCl_2$ $2.2Ti(OBu)_4$, prepared as described in example 1, were added. The mixture was reacted for 4 hrs at 90° C. in a rotavapor flask and then the solvent was evaporated under vacuum. At a temperature of 0° C. in inert atmosphere, 6 g of the Mg modified silica were slowly added under agitation to 100 mL of $TiCl_4$ containing 0.45 mmoles of diethyl 2,3-bis(isopropyl)succinate. The mixture was heated to 120° C., allowed to react at this temperature for 60 min. Then the stirring was discontinued, the solid product was allowed to settle and the supernatant liquid was siphoned off.

100 mL of fresh $TiCl_4$ were added. The mixture was reacted at 120° C. for 30 min. Then the stirring was discontinued, the solid product was allowed to settle and the supernatant liquid was siphoned off. Again, 100 mL of fresh $TiCl_4$ were added. The mixture was reacted at 120° C. for 30 min. Then the stirring was discontinued, the solid product was allowed to settle and the supernatant liquid was siphoned off.

The solid was washed six times with anhydrous hexane (6×100 mL) at 60° C. Finally, the solid was dried under vacuum. The resulting solid was sampled for the characterization the results are reported in table 1.

Example 3

Catalyst 3

5.3 g of alumina are suspended in inert atmosphere in 28 mL of anhydrous n-heptane. Then, 24.4 mmoles of $MgCl_2$ $2.2Ti(OBu)_4$, prepared as described in example 1, were added. The mixture was reacted for 4 hrs at 90° C. in a rotavapor flask and then, the solvent was evaporated under vacuum. 20 g of the so obtained solid were reacted with $TiCl_4$ according to the procedure of example 1, washed and dried.

Characterization of the solid so obtained is reported in table 1.

Example 4

Catalyst 4

6.2 g of alumina are suspended in inert atmosphere in 45 mL of anhydrous ethanol containing 26 mmoles of $MgCl_2$. The mixture was reacted for 4 hrs at 70° C. in a rotavapor flask and then, the ethanol was evaporated until a residual ethanol content of 4.9 moles of EtOH per mole of $MgCl_2$ was obtained. 6 g. of the so obtained solid were reacted with $TiCl_4$ according to the procedure of example 1 but using 1.8 mmoles of, diethyl 2,3-bis(isopropyl)succinate.

Characterization of the solid so obtained is reported in table 1.

Example 5

Catalyst 5

6.2 g of alumina are suspended in inert atmosphere in 25 mL of anhydrous tetrahydrofurane containing 25 mmoles of n-ButylMgCl. The mixture was reacted for 4 hrs at 30° C. in a rotavapor flask and then, the solvent was evaporated.

The solid was suspended in 12.5 mL of fresh tetrahydrofurane and, then, a solution of 25 mmoles of ethanol (EtOH) in 12.5 mL of tetrahydrofurane was slowly added dropwise at a temperature of 0° C. The mixture was reacted for 4 hrs at room temperature in a rotavapor flask and then, the solvent was evaporated.

5 g. of the so obtained solid were reacted with $TiCl_4$ according to the procedure of example 1 but using 2.4 mmoles of, diethyl 2,3-bis(isopropyl)succinate. Characterization of the solid so obtained is reported in table 1.

Example 6

Catalyst 6

12 g of silica not treated as described above were suspended, at room temperature and in inert atmosphere, in 120 mL of anhydrous heptane. Then, a solution containing 100 mmoles of $Mg(n\text{-}Butyl)_2$ in n-heptane was added dropwise under agitation. The temperature was rised to 90° C. and mantained for 1 h. The suspension was cooled down at a temperature of 20° C. and gaseous HCl was passed in it in 180 min, at constant stirring and mantaining the said temperature. The molar ratio between HCl and the organomagnesium compound was 10. After 30 min of post reaction, the liquid was filtered off and the solid was washed with anhydrous hexane. The solid was suspended in 120 mL of anhydrous heptane and, at 25° C. under stirring, 296 mmoles of anhydrous ethanol were added. The temperature was rised to 80° C. and mantained for 90 minutes under stirring, then, the suspension was cooled to 25° C. and 600 mmoles of $TiCl_4$ and 16.7 mmoles of diethyl 2,3-bis(isopropyl)succinate were added. The temperature was rised to 100° C. and kept for 120 minutes under stirring. Then the stirring was discontinued, the solid product was allowed to settle and the supernatant liquid was siphoned off. 320 mL of anhydrous toluene and mL 26 of $TiCl_4$ were added. The mixture was reacted at 110° C. for 120 minutes. Then the stirring was discontinued, the solid product was allowed to settle and the supernatant liquid was siphoned off. The solid was washed once with anhydrous toluene (1×100 mL) at 110° C., then, six times with anhydrous hexane(6×100 mL) at 60° C. Finally, the solid was dried under vacuum. Characterization of the solid is reported in table 1.

Comparative Example 1

Catalyst 7

At a temperature of −20° C. and in inert atmosphere, 100 mmoles of $MgCl_2 \cdot 2.2Ti(Obu)_4$, prepared as described in example 1, were added to 350 mL of anhydrous toluene containing 16.7 mmoles of diethyl 2,3-bis(isopropyl)succinate. At this temperature, 350 mL of $TiCl_4$ were added dropwise in 120 minutes under stirring. The mixture was heated and reacted at a temperature of 100° C. for 60 minutes and, then, filtered at 100° C. The solid was washed once with anhydrous toluene (1×100 mL) at 110° C., then, six times with anhydrous hexane(6×100 mL) at 60° C. Finally, the solid was dried under vacuum. Characterization of the solid is reported in table 1.

Propylene Polymerization: General Procedure

In a 4 liter autoclave, purged with nitrogen flow at 70° C. for one hour, 75 ml of anhydrous hexane containing 800 mg of $AlEt_3$, 79.8 mg of dicyclopentyldimethoxysilane and 10 mg of solid catalyst component indicated in table 2 were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The autoclave was vented and the recovered polymer was dried at 70° C. under vacuum for three hours. The features of the obtained polymers are reported in table 2.

TABLE 1

| Examples | Mg wt % | Ti wt % | diethyl 2,3-bis(isopropyl)-succinate wt % |
|---|---|---|---|
| 1 | 2.8 | 1.8 | 2.7 |
| 2 | 1 | 0.9 | 1.1 |
| 3 | 4 | 2.9 | 4.7 |
| 4 | 7.4 | 2.7 | 6.2 |
| 5 | 6.1 | 2.5 | 4.9 |
| 6 | 6.3 | 4.6 | 6.3 |
| Comp 1 | 15.7 | 4.9 | 12 |

TABLE 2

| polymerization Example | Catalyst | X.I. Wt % | MFR g/10' | P.I. |
|---|---|---|---|---|
| 1 | 1 | 98.6 | 0.5 | 5.0 |
| 2 | 2 | 98.8 | 1.2 | 6.8 |
| 3 | 3 | 98.5 | 0.3 | 5.0 |
| 4 | 4 | 98.3 | 0.3 | 5.0 |
| 5 | 5 | 98.4 | 0.8 | 6.0 |
| 6 | 6 | 98.2 | 0.8 | 5.3 |
| Comp 1 | 7 | 98.6 | 0.8 | 4.5 |

The invention claimed is:

1. A solid catalyst component for the polymerization of olefins of formula $CH_2=CHR$, in which R is hydrogen or a hydrocarbyl radical with 1–12 carbon atoms, comprising: an inert porous support, Mg, Ti, halogen and an electron donor selected from succinates of formula (I):

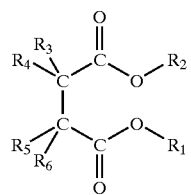

(I)

wherein the radicals $R^1$ and $R^2$, equal to or different from each other, are a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; the radicals $R^3$, $R^4$, $R^5$ and $R^6$, equal to or different from each other, are hydrogen or a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; and the radicals $R^3$, $R^4$, $R^5$ and $R^6$ which are joined to the same carbon atom can be linked together to form a $C_3$–$C_8$ ring; wherein the inert porous support is a metal oxide present in quantities greater than 40% by weight with respect to the total weight of the component.

2. The solid catalyst component according to claim 1 comprising a titanium compound, having at least a Ti-halogen bond, the compound of formula (I) and a Mg halide which are supported on an inert porous support.

3. The solid catalyst component according to claim 1 in which the electron donor compound of formula (I) is selected from those in which $R_1$ and $R_2$ are $C_1$–$C_8$ alkyl, $C_3$–$C_8$ cycloalkyl, $C_6$–$C_8$ aryl, $C_7$–$C_8$ arylalkyl and $C_7$–$C_8$ alkylaryl radicals.

4. The solid catalyst component according to claim 3 in which $R_1$ and $R_2$ are selected from primary $C_1$–$C_8$ radicals.

5. The solid catalyst component according to claim 1 in which the electron donor compound of formula (I) is selected from those in which $R_3$ to $R_5$ are hydrogen and $R_6$ is a branched alkyl, cycloalkyl, aryl, arylalkyl and alkylaryl radical having from 3 to 10 carbon atoms.

6. The solid catalyst component according to claim 5 in which $R_6$ is a branched primary alkyl group or a cycloalkyl group having from 3 to 10 carbon atoms.

7. The solid catalyst component according to claim 1 in which at least two radicals from $R_3$ to $R_6$ are different from hydrogen.

8. The solid catalyst component according to claim 7 in which the two radicals different from hydrogen are linked to the same carbon atom.

9. The solid catalyst component according to claim 7 in which the two radicals different from hydrogen are linked to different carbon atoms.

10. The solid catalyst component according to claim 9 in which the succinate of formula (I) is selected from diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, and diisobutyl 2-(cyclohexylmethyl)-3-ethyl-3-methylsuccinate.

11. The solid catalyst component according to claim 1 wherein the inert porous support is a porous metal oxide, or a porous polymer.

12. The solid catalyst component according to claim 11 wherein the inert porous support is a porous metal oxide.

13. The solid catalyst component according to claim 12 wherein the inert porous support is silica or alumina.

14. The solid catalyst component according to claim 1 wherein the inert porous support has a porosity greater than 0.3 cc/g, measured with the Hg method.

15. The solid catalyst component according to claim 1 wherein the surface area of the inert porous support is greater than 30 m²/g (BET).

16. A catalyst for the polymerization of olefins $CH_2=CHR$, in which R is hydrogen or a hydrocarbyl radical with 1–12 carbon atoms, comprising the product of the reaction between:
   (a) a solid catalyst component comprising an inert porous support, Mg, Ti and halogen and an electron donor selected from succinates of formula (I)

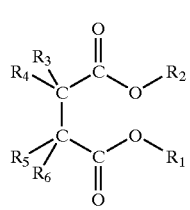

(I)

wherein the radicals $R^1$ and $R^2$, equal to or different from each other, are a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; the radicals $R^3$, $R^4$, $R^5$ and $R^6$, equal to or different from each other, are hydrogen or a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; and the radicals $R^3$, $R^4$, $R^5$ and $R^6$ which are joined to the same carbon atom can be linked together to form a $C_3$–$C_8$ ring;
   (b) an alkylaluminum compound and, optionally,
   (c) at least one electron donor compounds (external donor); wherein the inert porous support is a metal oxide present in quantities greater than 40% by weight with respect to the total weight of the component.

17. A process for preparing a solid catalyst component comprising an inert porous support, Mg, Ti, halogen and an electron donor selected from succinates of formula (I):

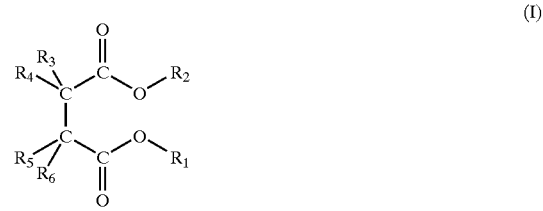

(I)

wherein the radicals $R^1$ and $R^2$, equal to or different from each other, are a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; the radicals $R^3$, $R^4$, $R^5$ and $R^6$, equal to or different from each other, are hydrogen or a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing heteroatoms belonging to groups 13–17 of the Periodic Table of the Elements; and the radicals $R^3$, $R^4$, $R^5$ and $R^6$ which are joined to the same carbon atom can be linked together to form a $C_3$–$C_8$ ring, the process comprising the steps of:
   (i) impregnating an inert porous support by suspending it in a solution of magnesium chloride in an organic solvent or in a hydrocarbon solution of a $MgCl_2.nTi(OR^7)_4$ complex where n is a number from 1 to 3, and $R^7$ is an $C_2$–$C_8$ alkyl, $C_3$–$C_8$ cycloalkyl or $C_6$–$C_8$ aryl radical and then evaporating the solvent.
   (ii) reacting the support obtained from step (i) with an excess of $TiCl_4$ containing a succinate of formulal (I) in solution at temperatures from 60° C. to 135° C.;
   (iii) separating the hot solid from the excess of $TiCl_4$ and then washing thoroughly with hexane or heptane until there are no chlorine ions in the wash; and
   (iv) optionally repeating the treatments (ii) and (iii); wherein the inert porous support is a metal oxide present in quantities greater than 40% by weight with respect to the total weight of the component.

18. The process of claim 17 wherein the hydrocarbon solution comprises hexane, heptane or a mixture thereof.

19. The process of claim 17 wherein the organic solvent is an alcohol or ether.

20. A process for polymerizing one or more olefins $CH_2=CHR$, in which R is hydrogen or a hydrocarbyl radical with 1–12 carbon atoms, comprising, contacting under polymerization condition one or more olefins CH$_2$=CHR in the presence of a catalyst comprising the product of the reaction between:

(a) a solid catalyst component comprising an inert porous support, Mg, Ti and halogen and an electron donor selected from succinates of formula (I):

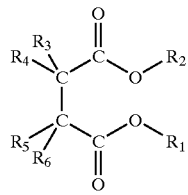
(I)

wherein the radicals R$^{and\ R2}$, equal to or different from each other, are a linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl or C$_7$–C$_{20}$ arylalkyl radical, optionally containing heteroatoms belonging to groups 13–17 of the Periodic Table of the Elements; the radicals R$^3$, R$^4$, R$^5$ and R$^6$, equal to or different from each other, are hydrogen or a linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl or C$_7$–C$_{20}$ arylalkyl radical, optionally containing heteroatoms belonging to groups 13–17 of the Periodic Table of the Elements; and the radicals R$^3$, R$^4$, R$^5$ and R$^6$ which are joined to the same carbon atom can be linked together to form a C$_3$–C$_8$ ring;

(b) an alkylaluminum compound and, optionally, (c) at least one electron donor compounds (external donor); wherein the inert porous support is metal oxide present in quantities greater than 40% by weight with respect to the total weight of the component.

* * * * *